United States Patent
Ohtsu (10) Patent No.: US 6,839,154 B1
(45) Date of Patent: Jan. 4, 2005

(54) IMAGE FORMING APPARATUS

(75) Inventor: Akira Ohtsu, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/497,230

(22) Filed: Feb. 3, 2000

(51) Int. Cl.[7] ............................. H04N 1/04; H04N 1/46; H04N 1/32; G06K 9/36; G06K 9/32
(52) U.S. Cl. ................... 358/475; 358/474; 358/528; 358/488; 358/468; 358/442; 382/276; 382/299
(58) Field of Search ................... 358/475, 474, 358/528, 488, 468, 442; 382/276, 299

(56) References Cited

U.S. PATENT DOCUMENTS

| | | | |
|---|---|---|---|
| 5,712,713 A | | 1/1998 | Hamanaka et al. ......... 358/451 |
| 5,872,636 A | * | 2/1999 | Kohtani et al. ............ 358/3.07 |
| 6,011,634 A | * | 1/2000 | Aihara et al. ............... 358/468 |

FOREIGN PATENT DOCUMENTS

| | | |
|---|---|---|
| JP | 60-19354 A | 1/1985 |
| JP | 9-181880 | 7/1997 |
| JP | 9-214750 | 8/1997 |

* cited by examiner

*Primary Examiner*—Edward Coles
*Assistant Examiner*—Houshang Safaipour
(74) *Attorney, Agent, or Firm*—Foley & Lardner LLP

(57) ABSTRACT

A system CPU checks whether a copying mode is selected. If the copying mode is selected, the system CPU calculates "read area=periphery of original 2-mm× 100÷magnification." If the copying mode is not selected, the system CPU checks whether a resolution conversion is effective or not. If the resolution conversion is not effective, the system CPU calculates "read area=periphery of original−2 mm×100÷magnification." If the resolution conversion is effective, the system CPU calculates "read area= periphery of original−2 mm." The system CPU instructs the scanner CPU to start scanning with the calculated read area.

9 Claims, 9 Drawing Sheets

FIG. 5A
READ IMAGE

PRINT

PRINTED IMAGE
VOID=2mm

FIG. 11A ORIGINAL

FIG. 11B READ AREA WITHIN BROKEN LINE

FIG. 11C ADD VOID AT TIME OF PRINTING

100%

FIG. 11D READ AREA WITHIN BROKEN LINE

FIG. 11E ADD VOID AT TIME OF PRINTING

IMAGE FORMING APPARATUS

BACKGROUND OF THE INVENTION

The present invention relates to an image forming apparatus for forming an image on a paper sheet in a printer unit on the basis of image data acquired by reading an original in a scanner unit.

There is known a conventional image forming apparatus having both a copying function of printing read image data and a scanner function of outputting image data to the outside. In this type of image forming apparatus, a void area (where no printing being effected) is provided on a peripheral portion of a paper sheet at the time of printing. This facilitates separation from a photosensitive drum in a printing process and prevents a stain on a transfer belt due to toner which has not been transferred onto a paper sheet.

In the copying function, when an input operation for an original is performed, only an area which will be actually printed on a paper sheet is read (a portion which will become a void at the time of printing is not read).

Figure 11A:
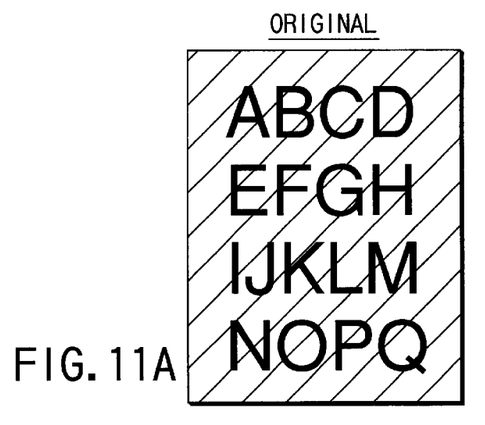
FIGS. 11A to 11G are views for describing prior-art read operations for reading areas to be printed on paper sheets.
Figure 11B:
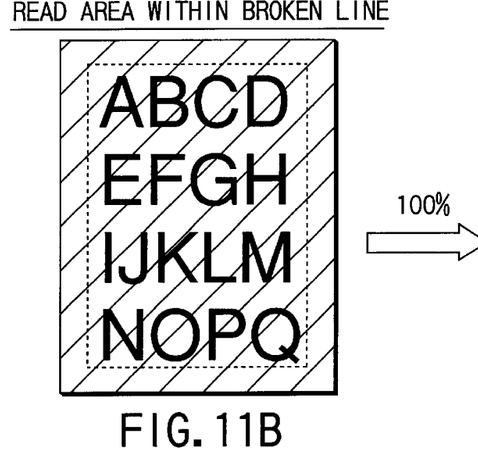
Figure 11C:
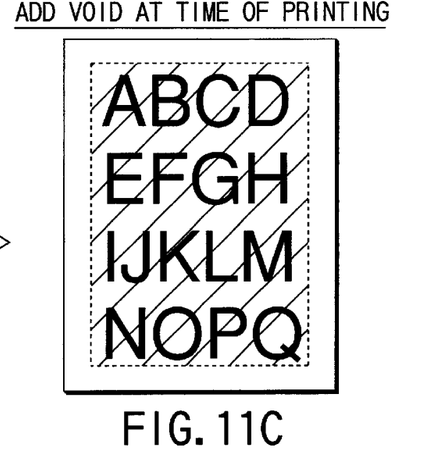

Specifically, when a copying operation with a magnification of, e.g. 100% is performed for an original shown in FIG. 11A, an area obtained by excluding a peripheral portion of "void width×100÷a magnification (100)" from an image to be printed on a paper sheet is read, as shown in FIG. 11B. In other words, a control is effected to provide a predetermined void on an image to be printed on the paper sheet, as shown in FIG. 1C. The paper sheet in this context refers to a printing medium.

Figure 11D:
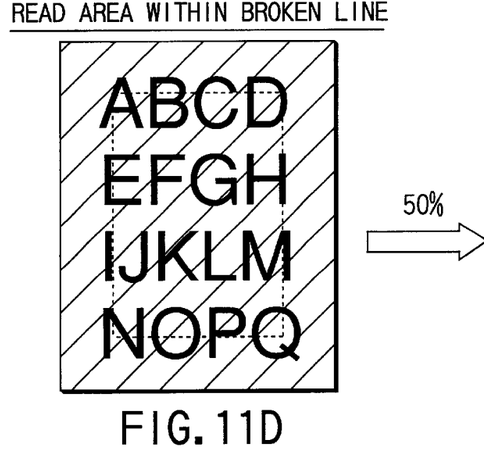
Figure 11E:
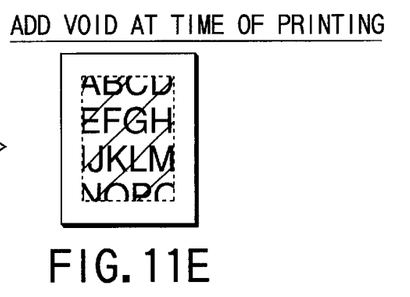

For example, when the magnification is 50%, an area obtained by excluding a peripheral portion of "void width× 100÷a magnification (50)" from an image to be printed on a paper sheet is read, as shown in FIG. 11D. At the time of printing, a void is provided as shown in FIG. 11E.

Figure 11F:
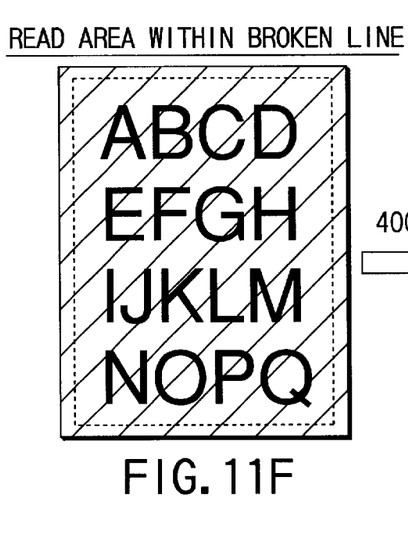
Figure 11G:
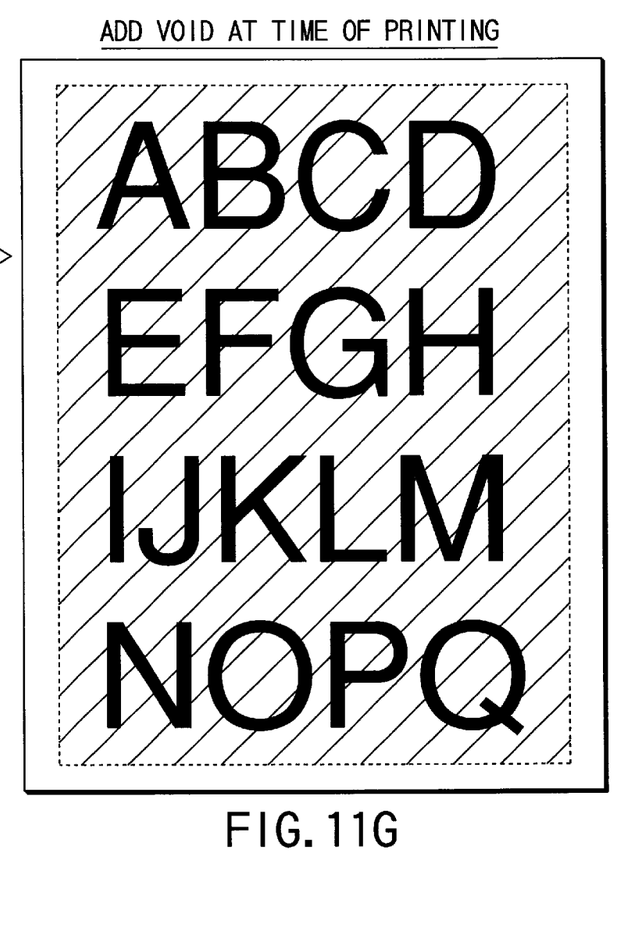

For example, when the magnification is 400%, an area obtained by excluding a peripheral portion of "void width× 100÷a magnification (400)" from an image to be printed on a paper sheet is read, as shown in FIG. 11F. At the time of printing, a void is provided as shown in FIG. 11G.

On the other hand, in the scanner function, enlargement/reduction is performed not only to merely vary the dimensions of an image, but also to realize a resolution conversion means. In this case, too, the read area is determined by the same method as with the above-described copying function.

In the conventional method, however, when the resolution conversion is performed by the scanner function, the read area on the original is varied. Consequently, obtained images will vary depending on the resolution. Thus, there is such a problem that the read area decreases depending on the resolution and image information (image data on the original) will be omitted.

BRIEF SUMMARY OF THE INVENTION

The object of the present invention is to provide an image forming apparatus capable of calculating a read area in accordance with settings and preventing omission of image information.

In order to achieve the above object, according to the present invention, there is provided an image forming apparatus comprising: reading means for optically scanning an original and reading an image; setting means for setting reading conditions, including a resolution conversion, at a time of reading the original with the reading means; and control means for calculating a read area on the original read by the reading means under the reading conditions including the resolution conversion set by the setting means, and controlling a reading operation by the reading means with the calculated read area.

According to the invention, there is also provided an image forming apparatus comprising: reading means for optically scanning an original and reading an image; setting means for setting reading conditions, including a resolution conversion, at a time of reading the original with the reading means; first calculation means for calculating a read area on the original read by the reading means, where the resolution conversion is set by the setting means; second calculation means for calculating the read area on the original read by the reading means, where the resolution conversion is not set by the setting means; and control means for controlling a reading operation by the reading means with the read area calculated by the first calculation means or with the read area calculated by the second calculation means.

According to the invention, there is also provided an image forming apparatus, connected to an external apparatus, for reading an image on an original according to an instruction from the external apparatus, and forming an image on an image formation medium on the basis of image data, comprising: reading means for optically scanning the original and reading an image; first calculation means for calculating a read area with addition of a void area of a predetermined width where no image is formed when an image is formed, in a case where a resolution conversion is performed according to an instruction from the external apparatus when the original is read by the reading means; second calculation means for calculating a read area with addition of a void area of a predetermined width where no image is formed when an image is formed in accordance with a magnification, in a case where a resolution conversion is not performed according to an instruction from the external apparatus when the original is read by the reading means; and control means for controlling a reading operation by the reading means with the read area calculated by the first calculation means or with the read area calculated by the second calculation means.

DETAILED DESCRIPTION OF THE INVENTION

An embodiment of the present invention will now be described with reference to the accompanying drawings.

Figure 1:
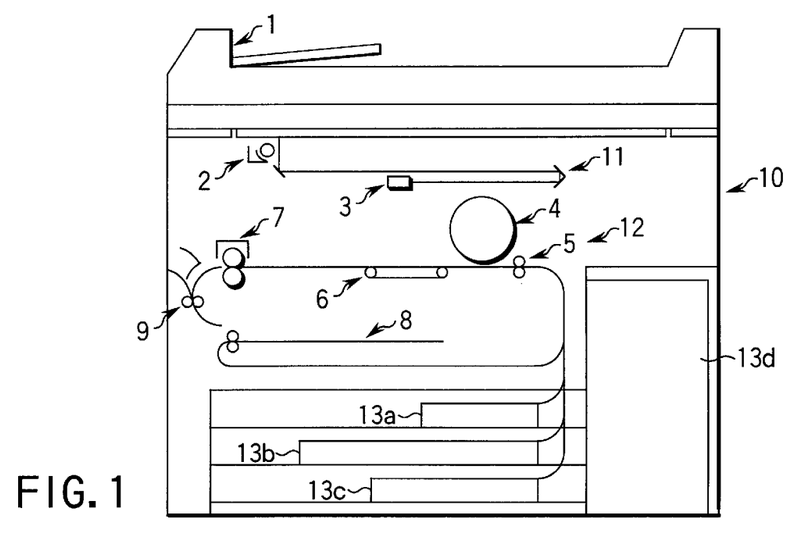
FIG. 1 is a cross-sectional view showing a schematic cross-sectional structure of an image forming apparatus according to the present invention.

FIG. 1 shows a schematic cross-sectional structure of an image forming apparatus according to the present invention. Specifically, this image forming apparatus 10 comprises a scanner 11 and a printer 12, and an automatic document feeder (ADF) 1 is mounted on an upper part thereof.

The scanner unit 11 serving as reading means includes a read light source (lamp) 2 as a light source, and a CCD sensor 3 for receiving reflection light from an original. The scanner unit 11 comprises a driving system (not shown) for varying positions of these elements and an A/D converter unit (not shown) for converting analog data of an output, i.e. image data (information), of the CCD sensor 3 to digital data.

In the printer unit 12 serving as image forming means, for example, a laser optical system is combined with an electrophotographic system capable of forming an image on transfer paper. Specifically, the printer 12 has a photosensitive drum 4 functioning as an image carrying body rotatably supported at a substantially central region within the apparatus. The printer 12 comprises register rollers 5, a transfer belt 6, a fixing device 7, an automatic double-side unit (ADU) 8, a reversing unit 9, etc.

Sheet feed cassettes 13a, 13b, 13c serving as sheet feed means are vertically stacked so as to be removable from a front side of the image forming apparatus 10. Copying paper sheets are stored in the sheet feed cassettes 13a, 13b, 13c. The copying paper sheets stored in the sheet feed cassettes 13a, 13b, 13c are picked up from an uppermost one by pickup rollers (not shown) and taken out.

A large-capacity sheet feeder (LCF) 13d is provided on a right side of the image forming apparatus 10. Copying paper sheets stored in the large-capacity sheet feeder 13d are picked up and taken out from an uppermost one by pickup rollers (not shown). A copying paper sheet fed to a take-out end side of the large-capacity sheet feeder 13d is conveyed toward the printer 12.

Figure 2:
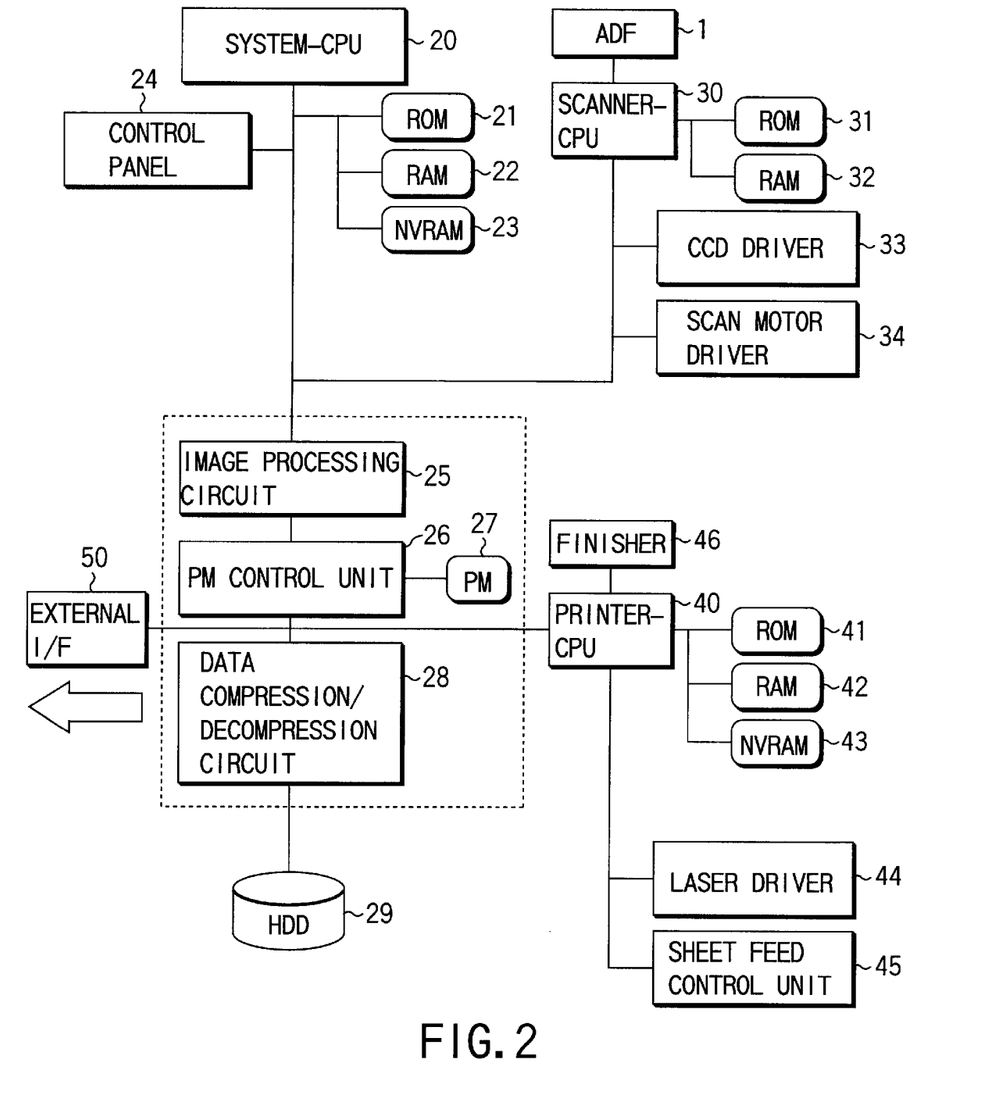
FIG. 2 is a block diagram schematically illustrating electrical connection in the image forming apparatus and a flow of signals for control.

FIG. 2 is a block diagram schematically illustrating electrical connection in the image forming apparatus 10 and a flow of signals for control. The image forming apparatus 10 comprises three CPUs, i.e. a system CPU (SYSTEM-CPU) 20, a scanner CPU (SCANNER-CPU) 30 of the scanner unit 11, and a printer CPU (PRINTER-CPU) 40 of the printer unit 12.

The system CPU 20 effects turning-on of LEDS/display of character sequences on a liquid crystal display (LCD) through operations on a control panel 24, a functional control according to operations, and instructions to the scanner CPU 30 and printer CPU 40.

The system CPU 20 receives state data from the scanner CPU 30 and printer CPU 40 by serial communication and displays it. The scanner CPU 30 and printer CPU 40 control respective driving devices in accordance with instructions from the system CPU 20.

The system CPU 20 is connected to a ROM 21, a RAM 22, an NVRAM 23, control panel 24, an image processing circuit 25, a page memory control unit (PM control unit) 26, a page memory (PM) 27, a data compression/decompression circuit 28, and a hard disk drive (HDD) 29. The system CPU 20 has an external interface (external I/F) 50 for connection with an external apparatus.

The system CPU 20 controls the entirety of the apparatus. The ROM 21 stores control programs. The RAM 22 temporarily stores data. The NVRAM (nonvolatile RAM) 23 is a nonvolatile memory backed up by a battery (not shown). When power is turned off, data on the NVRAM 23 is kept.

The image processing circuit 25 performs an image process for image data. The page memory control unit 26 stores and reads out image data in and out of the page memory 27. The page memory 27 has areas capable of storing image data on a plurality of pages and can store compressed data of image data in units of a page. The data compression/decompression circuit 28 compresses image data and expands compressed image data. The hard disk drive 29 stores various data as storage means.

The scanner CPU 30 is connected to a ROM 31 storing control programs, etc., a RAM 32 for storing data, a CCD driver 33 for driving the CCD sensor 3, a scan motor driver 33 for controlling the rotation of a motor which moves the read light source 2, etc., and automatic document feeder (ADF) 1.

The printer CPU 40 is connected to a ROM 41 storing control programs, etc., a RAM 42 for storing data, an NVRAM 43 which is a nonvolatile memory, a laser driver 44 for turning on/off light emission from a semiconductor laser (not shown), a sheet feed control unit 45 for controlling feeding of paper sheets, and a finisher (FINISHER) 46 for discharging paper sheets on which images have been formed.

Figure 3:
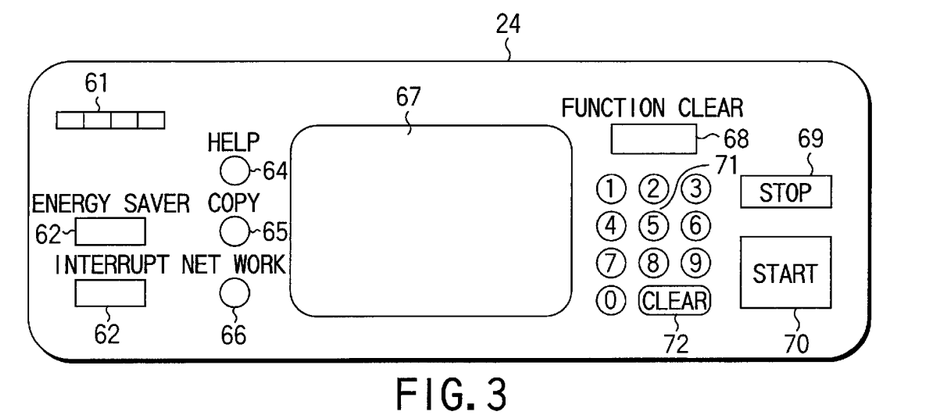
FIG. 3 shows a structure of a control panel.

FIG. 3 shows a structure of the control panel 24 serving as operating means. Specifically, the control panel 24 comprises a total counter 61, an energy saver (ENERGY SAVER) key 62, an interrupt (INTERRUPT) key 63, a help key 64, a copy key 65, a network (NETWORK) key 66, a message display device 67 constituted by a liquid crystal display (LCD) and a touch panel, a function clear (FUNCTION CLEAR) key 68, a stop key 69, a start key 70, ten-keys 71, and a clear key 72.

The message display device 67 displays in characters and pictures the states of the image forming apparatus, procedures of operations and various instructions for users. The message display device 67 serving as display means includes the touch panel for setting functions.

The stop key 69 is used to stop the copying operation.

The start key 70 is depressed to start copying.

The ten-keys 71 are used to set a desired number of copies.

The clear key 72 is used to correct the number of copies.

Figure 4:
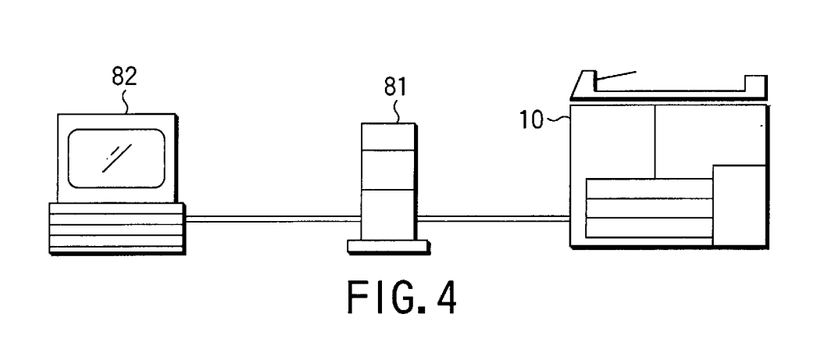
FIG. 4 shows an example of structure wherein an external apparatus is connected to the image forming apparatus.

FIG. 4 shows an example of structure wherein an external apparatus is connected to the image forming apparatus 10. Specifically, a client 82 comprising a personal computer, etc. is connected to the image forming apparatus 10 via the external interface 50 and a controller 81.

In the reading method in the image forming apparatus of the present invention, an area corresponding to a designated document size is multiplied with a magnification, and a calculated area is read. A read image is temporarily developed on the page memory. The image developed on the page memory is an image excluding a void to be added at the time of printing. Image data read in this embodiment is subjected to data compression and stored in the hard disk drive 29 as a file.

Figure 5A:
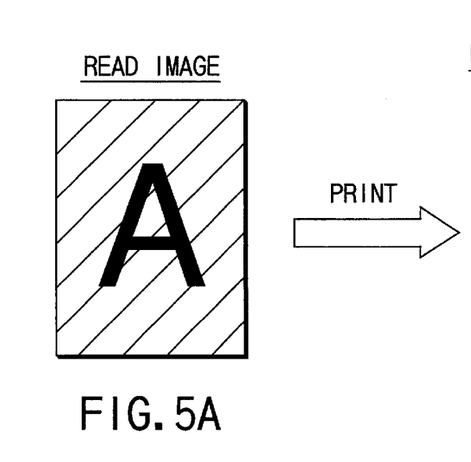
FIGS. 5A and 5B show an example of the addition of a void at the time of printing.
Figure 5B:
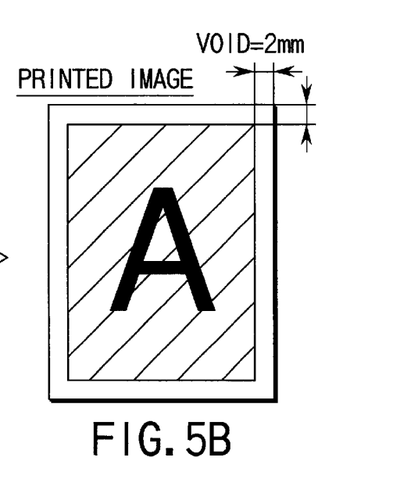

As is shown in FIGS. 5A and 5B, in this embodiment, a void is provided on a peripheral portion with 2 mm on a paper sheet. A void is added at the time of printing, and an image to be printed is set at a size excluding the void.

Where an original is read for copying in the image forming apparatus 10, the read area is determined on the presupposition that the read image will finally be printed on the paper sheet. Although details will be described later, the read area is altered in accordance with a magnification so that a void width becomes constant at the time of printing.

Figure 6A:
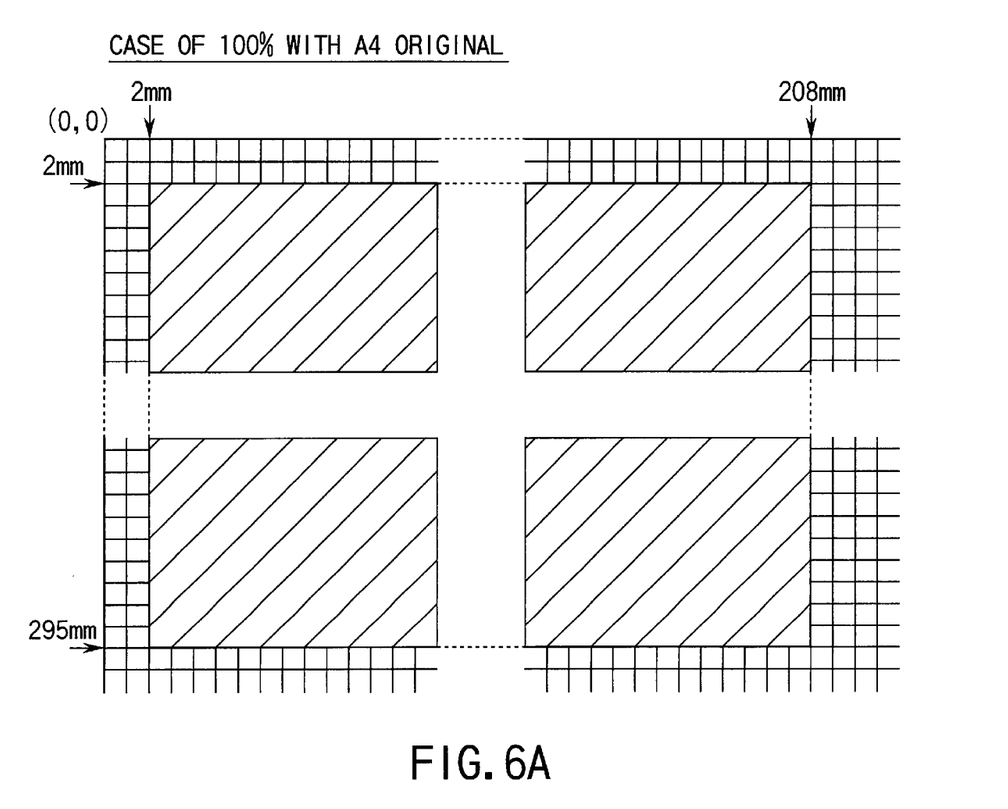
FIGS. 6A to 6C are views for describing a read area.
Figure 6B:
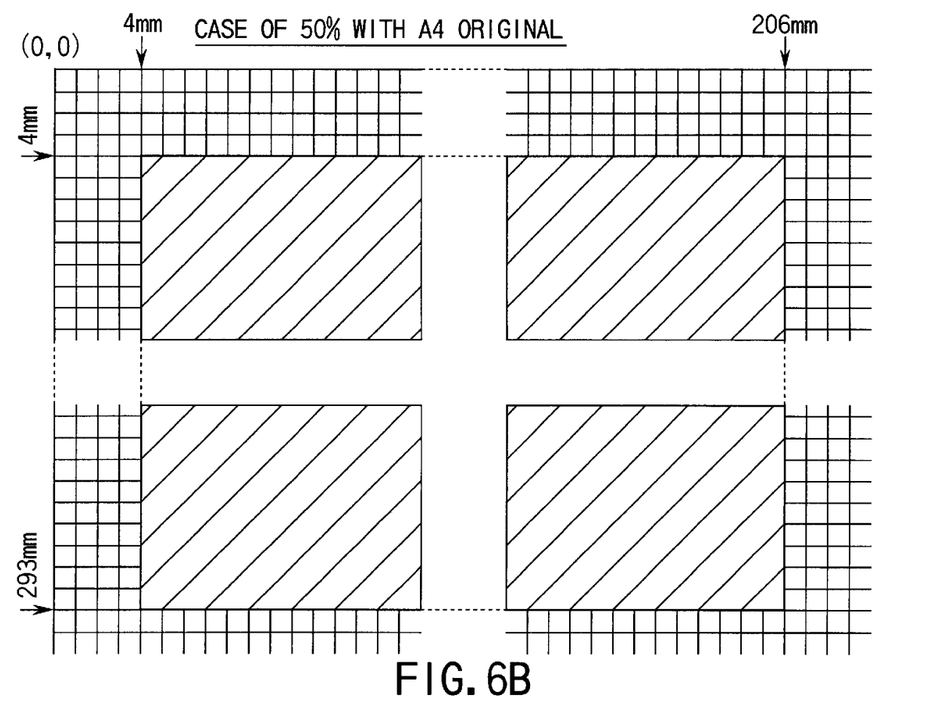
Figure 6C:
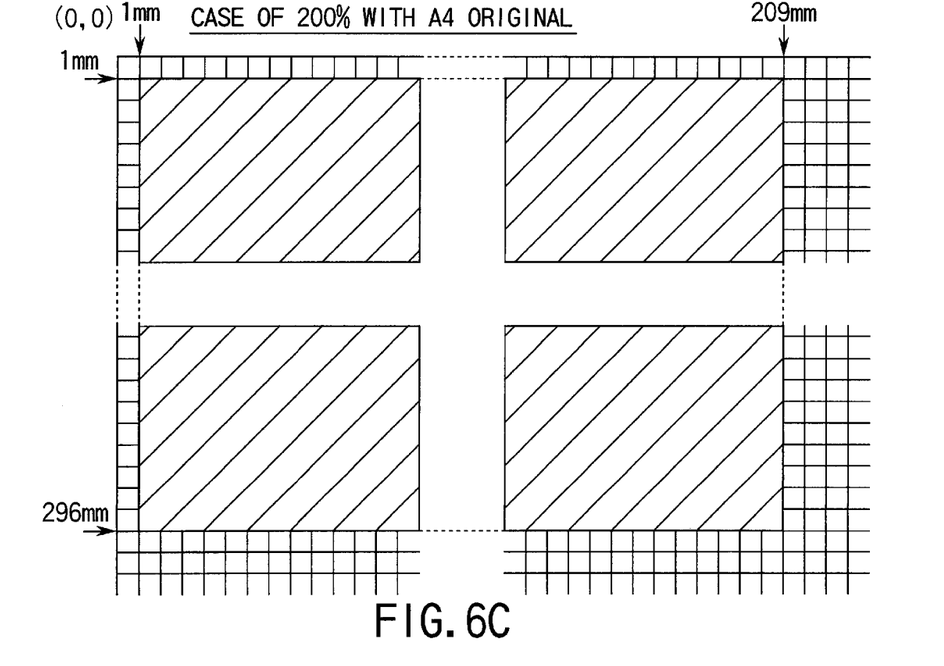

A description will now be given of a method of calculating the read area in the case of reading an original, with a corner of the original set at an original point (main scan direction: 0 mm/sub-scan direction: 0 mm). FIGS. 6A, 6B and 6C show examples of read areas corresponding to respective cases (magnifications) (assuming that the original is placed at the corner and the read area alone is shown).

Assume that the A4 size of the sheet is 297 mm in the main scan direction and 210 mm in the sub-scan direction.

In the case of an A4-size original with a magnification of 100%, as shown in FIG. 6A, the start point in the main scan direction:

0 mm+void width×100÷magnification=0 mm+2 mm×100÷100=2 mm, the end point in the main scan direction:

297 mm−void width×100÷magnification=297 mm−2 mm×100÷100=295 mm, the start point in the sub-scan direction:

0 mm+void width×100÷magnification=0 mm+2 mm×100÷100=2 mm, the end point in the sub-scan direction:

210 mm−void width×100÷magnification=210 mm−2 mm×100÷100=208 mm.

In the case of an A4-size original with a magnification of 50%, as shown in FIG. 6B, the start point in the main scan direction:

0 mm+void width×100÷magnification=0 mm+2 mm×50÷100=4 mm, the end point in the main scan direction:

297 mm−void width×100÷magnification=297 mm−2 mm×100÷50=293 mm, the start point in the sub-scan direction:

0 mm+void width×100÷magnification=0 mm+2 mm×100÷50=4 mm, the end point in the sub-scan direction:

210 mm−void width×100÷magnification=210 mm−2 mm×100÷50=206 mm.

In the case of an A4-size original with a magnification of 200%, as shown in FIG. 6C, the start point in the main scan direction:

0 mm+void width×100÷magnification=0 mm+2 mm×100÷200=1 mm, the end point in the main scan direction:

297 mm−void width×100÷magnification=297 mm−2 mm×100÷200=296 mm, the start point in the sub-scan direction:

0 mm+void width×100÷magnification=0 mm+2 mm×100÷200=1 mm, the end point in the sub-scan direction:

210 mm−void width×100÷magnification=210 mm−2 mm×100÷200=209 mm.

When variation in magnification is effected in the scanner function in the image forming apparatus 10 (where the scanner unit 11 in the image forming apparatus 10 is used merely as a scanner), there are two cases, one being where enlargement/reduction of an image is simply effected, the other being where enlargement/reduction is effected for resolution conversion.

Where an image is enlarged/reduced, a portion which will not be printed as a void at the time of printing is not read in consideration of the fact that the read image is printed. Since the image is enlarged/reduced to alter the size of the image, the read area is determined in accordance with a magnification as in the case of the copying function. The method of calculating the read area is also the same as with the copying function.

Where enlargement/reduction is effected for resolution conversion, the void width is set to be constant since the size of the image to be printed is unchanged. A portion which will become a void is not read in consideration of the printing.

In a method of calculating a read area (where an A4-size original is read), the start point in the main scan direction:

0 mm+void width=0 mm+2 mm=2 mm, the end point in the main scan direction:

297 mm−void width=297 mm−2 mm=295 mm, the start point in the sub-scan direction:

0 mm+void width=0 mm+2 mm=2 mm, the end point in the sub-scan direction:

210 mm−void width=210 mm−2 mm=208 mm.

Proper use of read area calculation methods will now be described.

As has been described above, the method of calculating the read area differs depending on functions. In the present invention, the two calculation methods are switched depending on the function (purpose).

Where the original is read in the copying function or the enlargement/reduction is effected in the scanner function, the read area is determined by subtracting "void width× 100÷magnification" from the peripheral portion of the original.

Where the resolution conversion is effected by the scanner function, the read area is determined by subtracting the void width from the peripheral portion of the original.

The selection between the copying function and the scanner function is performed by changing the mode (MODE) of the image forming apparatus with the depression of the network (NETWORK) key 66 on the control panel 24. The information on the mode of the image forming apparatus is stored in the RAM 22, and this information can be referred to.

The image forming apparatus 10 can be informed by the client 82 via the controller 81 as to whether or not the resolution conversion is effected. This information, too, is stored in the RAM 22 and can be referred to.

The system CPU 20 refers to this information, determine the designated function, and switches the read area calculation method.

The reading operation in the image forming apparatus with the above structure will now be described with reference to FIGS. 7 to 10.

Figure 7:
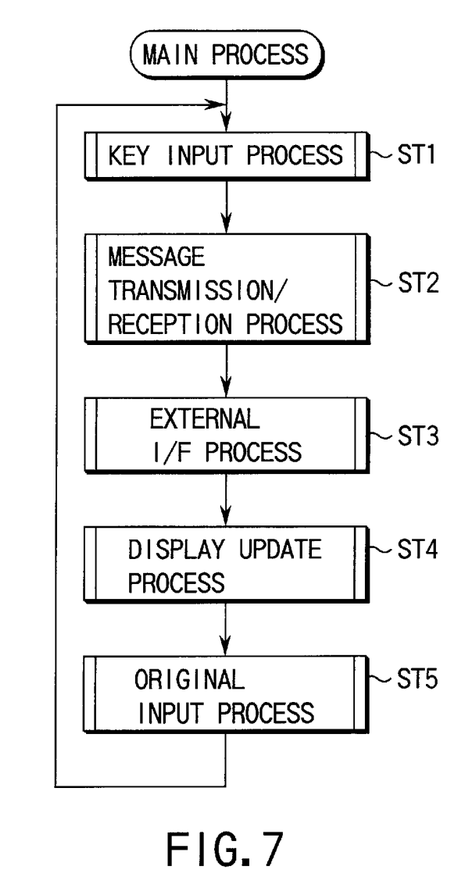
FIG. 7 is a flow chart for illustrating a read operation of the image forming apparatus.

In a main process illustrated in FIG. 7, the system CPU 20 executes a key input process (ST1) through the control panel 24, a message transmission/reception process (ST2), a process of the external interface 50 (ST3), a display update process (ST4) of the message display device, and an original input process (ST5) through the automatic document feeder 1.

Figure 8:
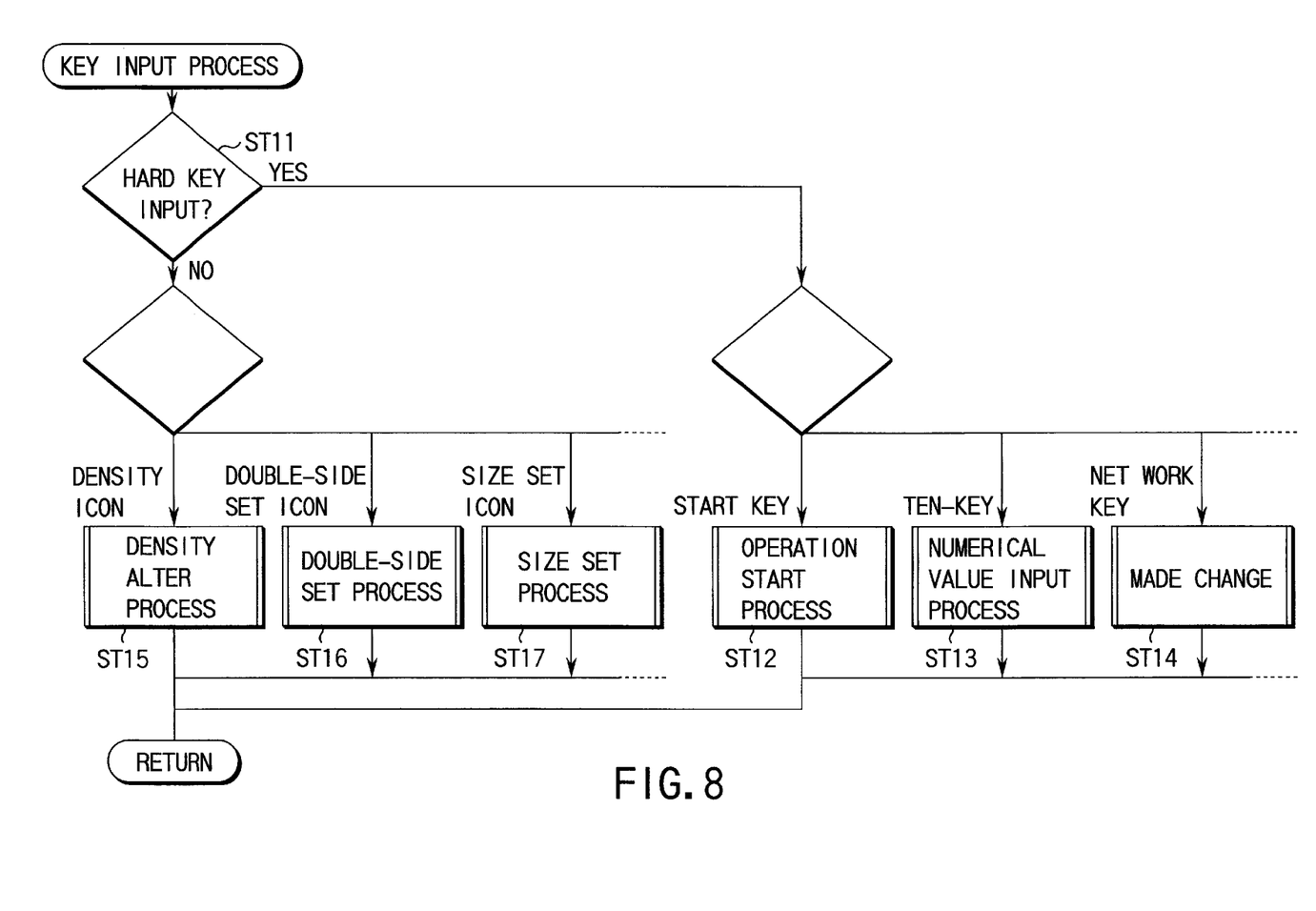
FIG. 8 is a flow chart for illustrating a read operation of the image forming apparatus.

In a key input process illustrated in FIG. 8, if a hard key input is made (ST11) and the start key 70 is depressed, the system CPU 20 executes an operation start process (ST12). If the ten-keys 71 are depressed, the system CPU 20 executes a numerical value input process (ST13). If the network (NETWORK) key 66 is depressed, the system CPU 20 changes the mode (MODE) (ST14). If some other hard key input is made, the system CPU 20 executes an associated process.

If not the hard key input but icon input is made (ST11) and a density icon is selected, the system CPU 20 executes a density alter process (ST15). If a double-side set icon is selected, the system CPU 20 executes a double-side set process (ST16). If a size set icon is selected, the system CPU 20 executes a size set process (ST17). If some other icon input is made, an associated process is performed.

Figure 9:
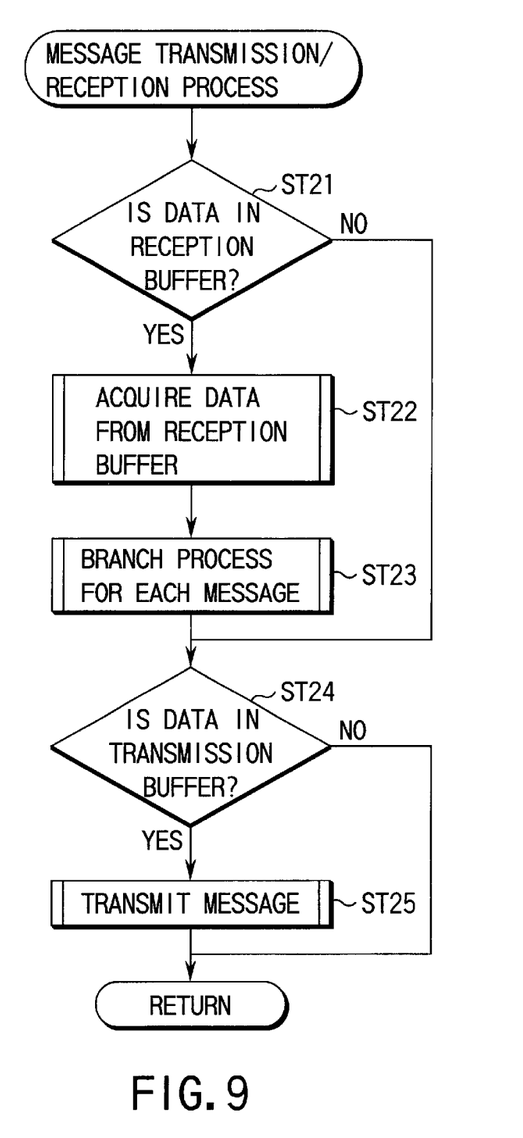
FIG. 9 is a flow chart for illustrating a read operation of the image forming apparatus.

In a message transmission/reception process illustrated in FIG. 9, the system CPU 20 performs a communication process with the scanner CPU 30. If there is data in a reception buffer (ST21), the system CPU 20 acquires data from the reception buffer (ST23) and processes each message (ST24). If there is data in a transmission buffer (ST25), a message is transmitted (ST26).

Figure 10:
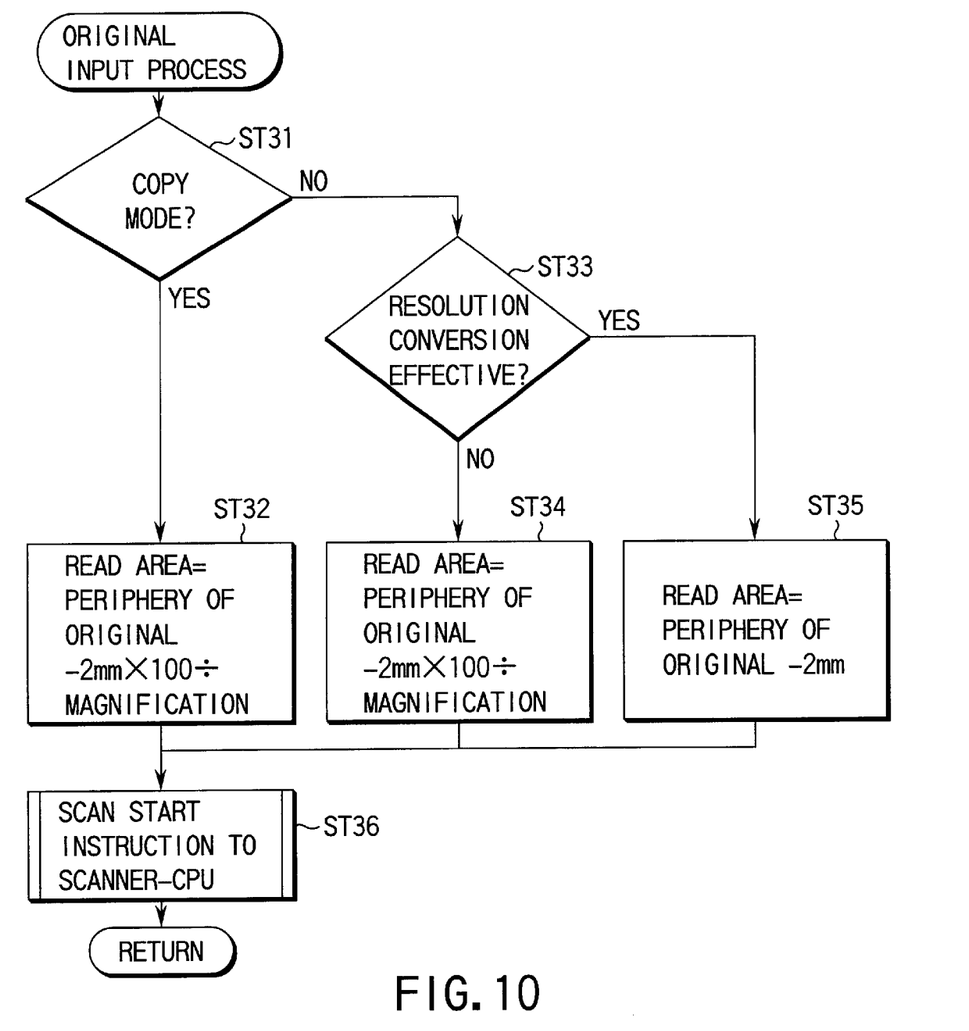
FIG. 10 is a flow chart for illustrating a read operation of the image forming apparatus.

In an original input process illustrated in FIG. 10, the system CPU 20 checks whether the copying mode is selected (ST31). If the copying mode is selected, the system CPU 20 calculates "read area=periphery of original−2 mm×100÷magnification" (ST32).

If the copying mode is not selected in step ST31, the system CPU 20 checks whether the resolution conversion is effective (ST33). If the resolution conversion is not effective, the system CPU 20 calculates "read area= periphery of original−2 mm×100÷magnification" (ST34). If the resolution conversion is effective, the system CPU 20 calculates "read area=periphery of original−2 mm" (ST35).

The system CPU 20 then instructs the scanner CPU 30 to start scan, with the read area calculated in step ST32, step ST34 or step ST35 (ST36).

According to the above-described embodiment of the present invention, the read area is automatically determined in accordance with the functions. Thereby, separation performance in the printing process is facilitated and a stain on the transfer belt is prevented (degradation in transfer performance is prevented). Moreover, the original can be read without omission of image due to an excess void area. Therefore, the image input can be effected, as desired by the user, and the degradation in performance of the image forming apparatus can be reduced to a minimum.

What is claimed is:

1. An image forming apparatus comprising:
   reading means for optically scanning an original and reading an image;
   setting means for setting reading conditions, including a resolution conversion, at a time of reading the original with said reading means; and
   control means for checking whether the resolution conversion is effective or not effective when the reading conditions are set, for calculating a read area in a first calculation method when the resolution conversion is effective and calculating the read area in a second calculation method when the resolution conversion is not effective, and for controlling a reading operation by said reading means with the read area calculated in said first calculation method or with the read area calculated in said second calculation method.

2. An image forming apparatus according to claim 1, wherein said first calculation method calculates the read area, when image formation is performed, with addition of a void area of a predetermined width where no image is formed, wherein said read area is calculated independent of a magnification set at a time of magnification alteration for the resolution conversion.

3. An image forming apparatus according to claim 1, wherein said first calculation method calculates the read area according to "read area=periphery of original−width of void where no image is formed."

4. An image forming apparatus according to claim 1, wherein said first calculation method calculates, with a corner of the original set as an original point, a read start point in a main scan direction according to "original point+ width of void where no image is formed," a read end point in the main scan direction according to "width of original in main scan direction−width of void where no image is formed," a read start point in a sub-scan direction according to "original point+width of void where no image is formed," and a read end point in the sub-scan direction according to "width of original in sub-scan direction−width of void where no image is formed."

5. An image forming apparatus according to claim 1, wherein said second calculation method calculates a read area, when image formation is performed, with addition of a void area of a predetermined width where no image is formed, wherein said read area is calculated according to a magnification.

6. An image forming apparatus according to claim 1, wherein said second calculation method calculates the read area according to "read area=periphery of original−width of void where no image is formed×100÷magnification."

7. An image forming apparatus according to claim 1, wherein said second calculation method calculates, with a corner of the original set as an original point, a read start point in a main scan direction according to "original point+ width of void where no image is formed× 100÷magnification," a read end point in the main scan direction according to "width of original in main scan direction−width of void where no image is formed× 100÷magnification," a read start point in a sub-scan direction according to "original point+width of void where no image is formed×100÷magnification," and a read end point in the sub-scan direction according to "width of original in subscan direction−width of void where no image is formed× 100÷magnification."

8. An image forming apparatus, connected to an external apparatus, for reading an image on an original according to an instruction from the external apparatus, and forming an image on an image formation medium on the basis of image data, comprising:
   reading means for optically scanning the original and reading an image; and
   control means for checking whether a resolution conversion is rendered effective or not effective by the instruction from the external apparatus, for calculating a read area in a first calculation method when the resolution conversion is effective and calculating the read area in a second calculation method when the resolution is not effective, the first calculation method being a method wherein a void area having no image is added by a predetermined width, and the second calculation method being a method wherein the void area is added in accordance with a modification, and for controlling a reading operation by said reading means with the read area calculated in said first calculation method or with the read area calculated in said second calculation method.

9. An image forming apparatus comprising:
   a scanner for optically scanning an original and reading an image;
   a control panel or external interface for setting reading conditions, including a resolution conversion, at a time of reading the original by the scanner; and
   a control unit configured for:

calculating a first read area when a resolution conversion is effective at a time of setting reading conditions by said control panel or external interface;

calculating a second read area when a resolution conversion is not effective at the time of setting reading conditions by said control panel or external interface; and controlling a reading operation by said scanner with the first read area or with the second read area based on whether a resolution conversion is effective at the time of setting reading conditions or not, respectively.

* * * * *